United States Patent Office 3,420,390
Patented Jan. 7, 1969

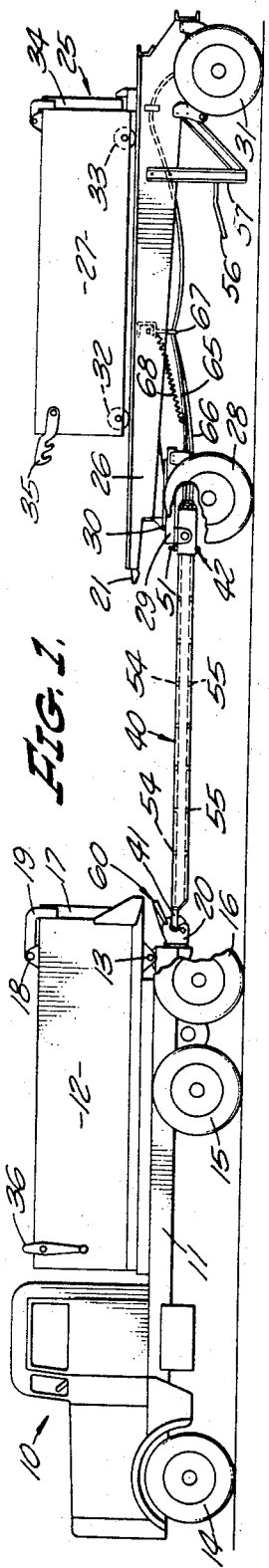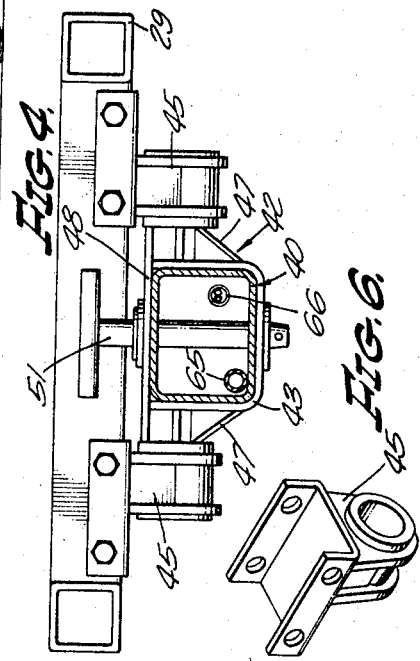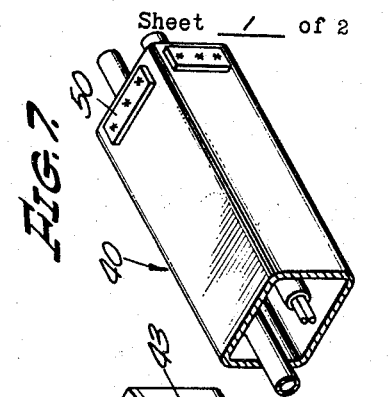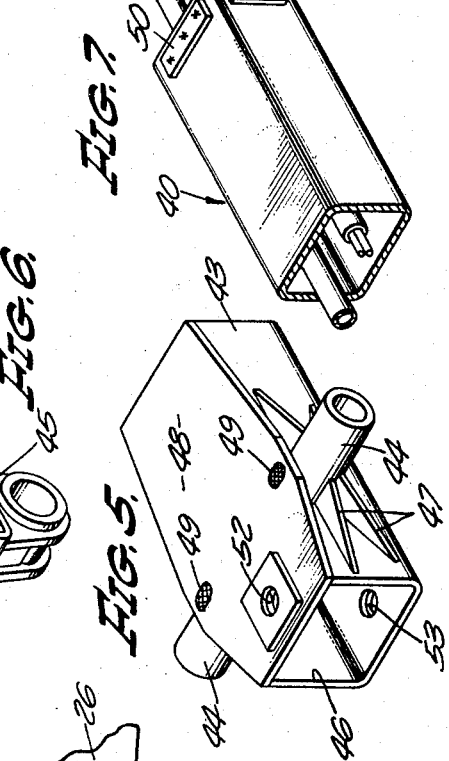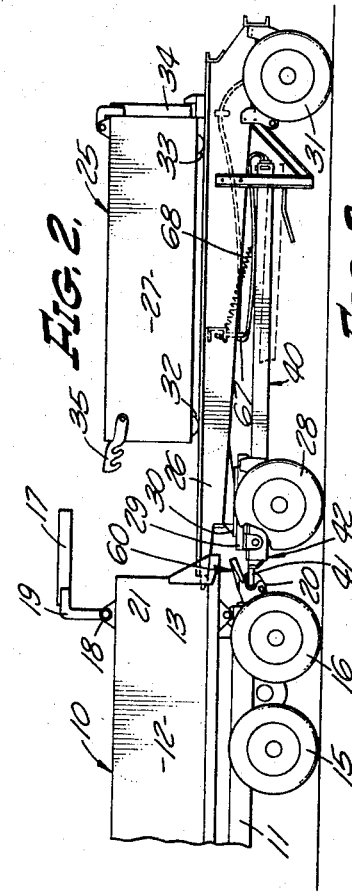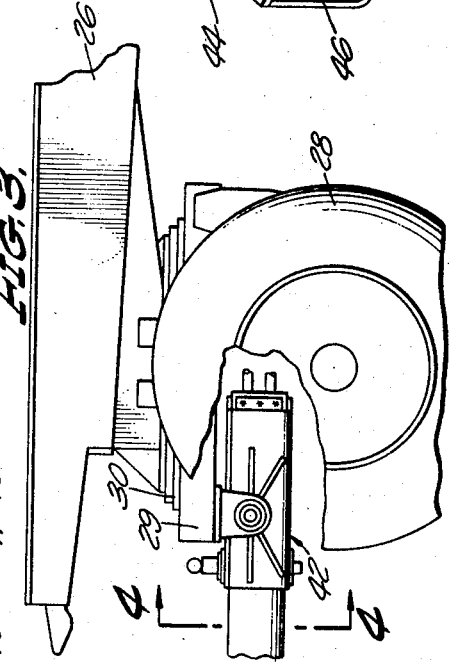

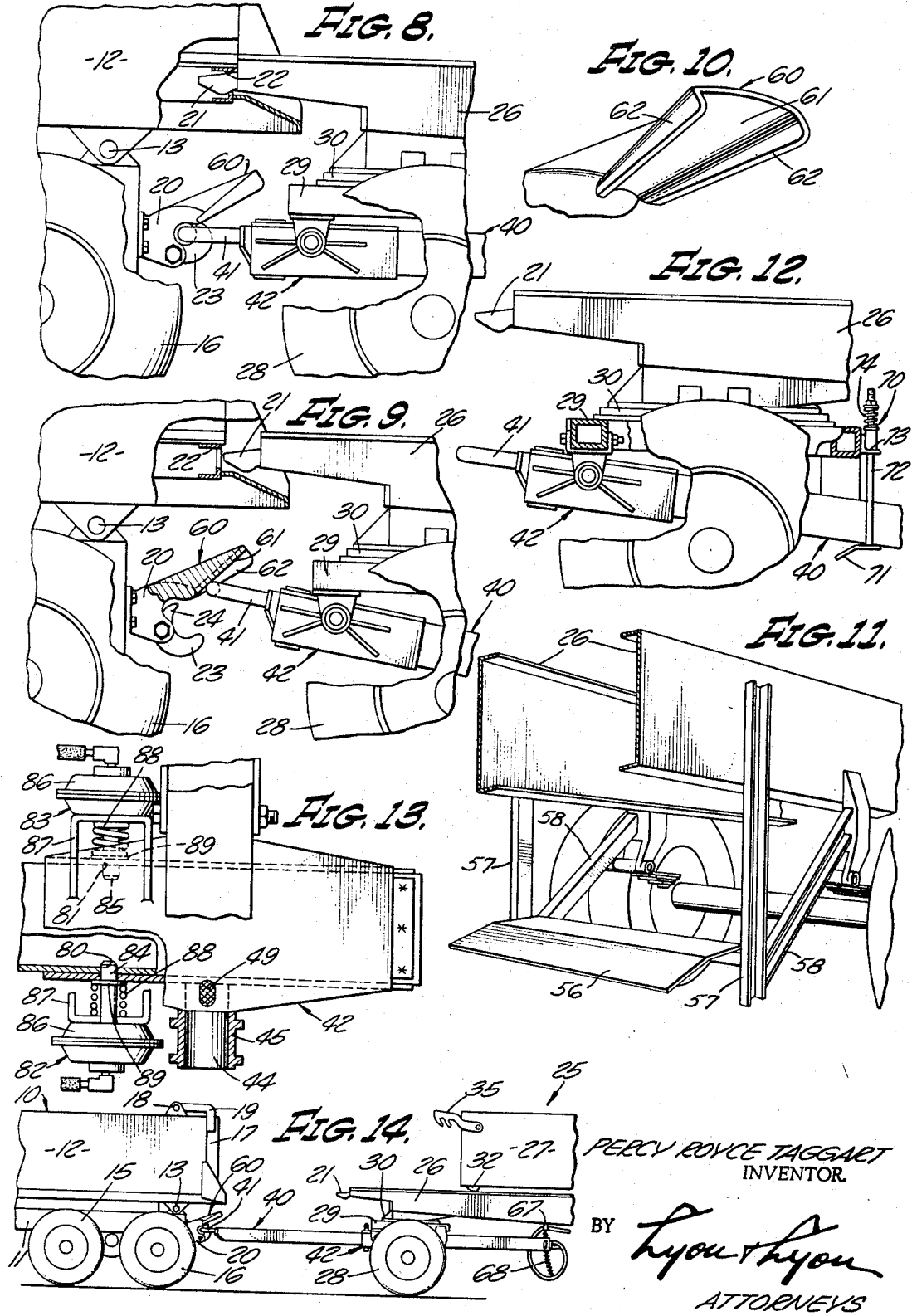

3,420,390
TRANSFER TRAILER DRAWBAR DEVICE
Percy Royce Taggart, Alhambra, Calif., assignor to Challenge-Cook Bros., Incorporated, La Mirada, Calif., a corporation of California
Filed June 23, 1966, Ser. No. 559,821
U.S. Cl. 214—38       17 Claims
Int. Cl. B65g 67/00

ABSTRACT OF THE DISCLOSURE

A drawbar arrangement on a transfer trailer for allowing the forward transfer of the trailer body to the dump truck used in pulling the trailer, wherein an elongated drawbar is supported in a housing mounted at the front of the trailer and steers the front wheels of the trailer upon lateral pivoting of the drawbar. The drawbar is releaseably locked to the housing in an extended position during transit and when released is slidable longitudinally relative to the housing to telescope the drawbar under the trailer completely clear of the trailer front for the convenient transfer of the trailer body to and from the trailer.

---

This invention relates to bulk material hauling trailers of the type in which the trailer body is transferred into the body of a dump truck at the destination for accomplishing the dumping of the material from the trailer body and in particular is directed to an arrangement wherein the trailer body transfer is accomplished over the front of the trailer.

Transfer trailers, as they are commonly known in the industry, have many operational and economic advantages. The truck and trailer comprise a payload far in excess of that which the dump truck alone could deliver for each trip and yet the job site maneuverability of the dump truck for dumping the load is maintained. A conventional dump truck and transfer trailer combination is operated at a job site to dispense its load by first parking the trailer and unhitching it from the dump truck whereupon the truck progresses to the desired location and dumps its load, second the empty dump truck returns and couples to the trailer for transferring the loaded trailer body into the empty dump truck body where it is latched into position, third the trailer body load is dumped by the truck at the appropriate location and the truck returns to the trailer chassis to retransfer the trailer body thereto, and finally the dump truck is recoupled to the trailer for return transit.

Most of the heretofore conventional transfer trailers have been adapted to transfer the trailer body off the rear of the trailer chassis by backing the empty dump truck up to the rear of the trailer. This rear transfer arrangement has been preferred because it avoids the obstruction formed by the trailer tongue or drawbar present at the front of the trailer. While front transfer type trailers have been constructed they are generally considered unsatisfactory due to the requirement that the trailer drawbar be pivoted very close to the ground to allow the truck to back over the tongue for accomplishing transfer. This creates various objectionable characteristics such as inadequate road clearance at the pivotal mounting of the trailer drawbar, the extreme forces involved in pulling the trailer from the low pivot point, the potential damage to the drawbar in straddling same with the truck wheels, etc.

The rear transfer type trailer has the inherent disadvantage from an operational standpoint of requiring that the trailer be parked at a location where there is adequate space for the dump truck to maneuver both to the front and rear of the trailer and some way in which the truck can maneuver from the front to the rear of the trailer. This last mentioned deficiency results in many situations involving narrow access roads or one-way travel where the dump truck must travel many miles in order to maneuver from in front of the trailer to the rear of the trailer for the various operations. Moreover, the rear tansfer type trailer involves at least one more maneuver of the dump truck than a front transfer type in that after return of the emptied trailer body to the rear of the trailer chassis the truck must maneuver to the front of the trailer to recouple to the trailer drawbar whereas with a front transfer type the truck need merely pull forward a short distance.

The trailer tongue or drawbar must be of considerable length, for example fifteen feet, in order to accomplish the necessary spacing between the dump truck and the trailer. Such spacing is required to provide the proper axle and wheel loads whereby the loads of the two vehicles are not localized over too short a length which would jeopardize bridges and other roadways susceptible to damage from excessive loading. Moreover, most Vehicle Codes or like statutes in various jurisdictions governing the load and axle limits of trucks and trailers require certain axle spacing and vehicle lengths for particular permissive loads which are calculated in accordance with requirements known as "bridge formulas." While a lengthy trailer drawbar is necessary to meet these various requirements under load conditions, such drawbar adversely affects the maneuverability of the combined truck and trailer and is entirely unnecessary under either off-highway or no-load conditions. Further, heretofore the extremely dangerous but virtually unavoidable manner in which the trailer tongue has been recoupled to the dump truck after completion of unloading has been for the operator to start the truck in motion in reverse toward the trailer at a slow speed, leap from the truck cab to take a position between the truck and trailer, and physically align the trailer drawbar with the truck hitch so that recoupling is achieved and the truck is stopped.

Accordingly, it is a principal object of this invention to provide a novel form of transfer trailer in which the trailer drawbar is retracted or telescoped into the trailer to a completely unobstructed position for permitting transfer of the trailer body to a dump truck without otherwise adversely affecting the operations and functions of such truck and trailer.

Another object of this invention is to provide a novel form of trailer drawbar and connection with the pivotal wheels of a trailer whereby the length of the drawbar may be varied conveniently as required or desired.

A further object of this invention is to provide a novel front transfer type trailer arrangement wherein the trailer drawbar is telescoped into the trailer upon hook-up for trailer body transfer to the truck and the trailer drawbar is automatically positioned for recoupling to the dump truck during the retransfer of the trailer body from the truck to the trailer chassis. A still further object of this invention is to provide such an arrangement wherein the trailer drawbar may be locked and unlocked in its extended position from a remote location such as the truck cab whereby the initiation of the drawbar retraction and completion of the drawbar extension may be accomplished by the operator without leaving the truck controls.

Other and more detailed objects and advantages of this invention will appear from the following description and the accompanying drawings, wherein:

FIGURE 1 is an elevation view of the dump truck and transfer trailer arrangement of this invention in the extended position of the trailer drawbar for normal full load operation.

FIGURE 2 is a fragmentary elevation view of the dump truck and transfer trailer of this invention in the connected condition for transferring the trailer body between the dump truck and the trailer chassis.

FIGURE 3 is an enlarged fragmentary elevation view of the connection assembly between the trailer drawbar and the fifth wheel subframe for the front axle of the trailer.

FIGURE 4 is a sectional view of the trailer drawbar connection taken substantially on the line 4—4 shown in FIGURE 3.

FIGURE 5 is a perspective view of the support housing portion of the connection assembly shown in FIGURE 3.

FIGURE 6 is a perspective view of the bearing hanger for the trunnion mounting of the support housing shown in FIGURE 5.

FIGURE 7 is a fragmentary perspective view of the rear end portion of the trailer drawbar which fits within the housing shown in FIGURE 5.

FIGURE 8 is an enlarged fragmentary elevation view of the connected portions of the truck and trailer in the condition illustrated in FIGURE 2 for transferring the trailer body to and from the dump truck.

FIGURE 9 is an enlarged fragmentary view similar to FIGURE 8 showing the respective components in the positions illustrating the condition both immediately preceding and immediately subsequent to the mating interconnection between the truck and trailer as it is shown in FIGURE 8.

FIGURE 10 is a fragmentary perspective view of the guide fixture on the truck portion of the trailer hitch which serves to guide the recoupling of the trailer drawbar to the truck.

FIGURE 11 is a fragmentary perspective view of the rear portion of the trailer illustrated in the preceding views and shows the support arrangement for the rear end of the drawbar when it is in the retracted position.

FIGURE 12 is a fragmentary elevation view of a modified form of a device for supporting the trailer drawbar as a substitution for the arrangement illustrated in FIGURE 11.

FIGURE 13 is a fragmentary plan view with portions shown in section of a modified arrangement for automatically and remotely locking and unlocking the trailer drawbar in the desired extended or retracted position.

FIGURE 14 is a fragmentary elevation view of the truck and transfer trailer of this invention with the drawbar locked in an intermediate position whereby the trailer is more closely coupled to the truck for increased maneuverability in either unloaded or off-highway operating conditions.

Referring more particularly to FIGURE 1, a typical combination of a three-axle dump truck and transfer trailer employing the arrangement of this invention is shown in the normal travel condition. The dump truck, generally designated 10, includes a conventional chassis 11 on which is mounted a dump body 12 for pivoting about the pin 13 for dumping the load within the dump body. The truck is provided with steerable front wheels 14 and tandem axle rear wheels 15 and 16. The tailgate 17 of the dump truck is pivotally mounted at 18 by an offset arm 19 for upward pivoting completely out of the way as shown in FIGURE 2. The rear of the truck 10 is provided with a hook type hitch 20 which may be modified in a manner hereinafter described as a cooperative part of the arrangement of this invention.

The transfer trailer, generally designated 25, includes a trailer frame or chassis 26 on which is removably mounted the trailer body 27. The trailer 25 includes front wheels 28 the axle of which is mounted on a subframe 29 connected through a conventional fifth wheel arrangement 30 to the frame 26 whereby the front wheels 28 may be pivoted about a vertical axis for steering the trailer through the drawbar. The trailer 25 also includes rear wheels 31 mounted at the very rear of the frame 26. The trailer frame 26 includes a pair of spaced parallel rails for supporting wheels 32 and 33 mounted on the trailer body 27. The trailer body 27 is normally latched in a fixed position on the frame 26 but when desired is moved therealong by an electric motor which drives rollers 32 or 33. The trailer dump body includes a tailgate 34 adapted to pivot open for dumping the load therefrom. Latch arms 35 at the front on either side of the trailer body 27 are adapted to be releasably connected to a bar 36 extending across the front of dump body 12 of the truck when the trailer body 27 is positioned inside the dump body 12. As thus far described, the dump truck 10 and the transfer trailer 25 are substantially conventional although certain details of construction may differ for various manufacturers.

The transfer trailer 25 is connected to the dump truck 10 by a tongue or drawbar 40 which has a pintle eye 41 adapted to latch into the hitch 20. The drawbar 40 illustrated in the drawings is itself unique but it is to be noted that heretofore conventional transfer trailers have also included drawbars of various configurations and of the predetermined necessary length for properly spacing the truck and trailer. The rather lengthy spacing between the truck and trailer as illustrated in FIGURE 1 is not necessary for the maneuverability of the truck and trailer, in fact it deters from such maneuverability, but rather is required to accomplish proper spacing among the wheels and axles of the two vehicles. Such spacing is needed to prevent overloading of bridges or other roadway structures as well as complying with the legal requirements of Vehicle Codes relative to such axle spacing. A typical example of the Vehicle Code requirements which must be met and which also fairly represent the spacing desired regardless of the applicability of the code is that the overall length of the combined vehicles (truck and trailer) cannot exceed 60 feet, the load imposed upon the highway by the wheels of one axle cannot exceed 18,000 pounds, the load imposed by any group of two or more consecutive axles within 18 feet cannot exceed an amount graduated between 32,000 and 46,400 for a spacing graduated between 5 and 18 feet, and finally the total load imposed on the highway by the combination of vehicles cannot exceed an amount graduated from 46,400 to 76,800 pounds for distances between the first and last axles graduated between 18 and 56 feet. Since from a practical standpoint the dump truck 10 requires the tandem rear axles having wheels 15 and 16 which are normally loaded to near the practical and legal limit, the front axle and wheels 28 of the trailer 25 must be spaced a sufficient distance rearwardly whereby the load thereon does not result in a violation of the practical and legal limits defined by these graduated axle load-spacing formulas. As a result, the trailer drawbar for heavy bulk load equipment of this type will normally be in the range of 10 to 15 feet long. For example the combination truck and trailer illustrated in FIGURE 1 would most advantageously be nearly 60 feet in overall length with about a 15 foot drawbar 40 to accomplish the desired spacing.

By this invention an arrangement and means are provided for telescoping the trailer drawbar 40 to a location beneath the trailer whereby the dump truck 10 may be connected to the front of the trailer frame 26 for receiving the trailer body 27 and, as shown in the drawings, this may include a support assembly, generally designated 42, receiving the drawbar 40. The support assembly 42 is mounted on the subframe 29 whereby the lateral movement of the drawbar with the truck will cause pivoting of the subframe 29 by reason of the fifth wheel arrangement 30 to steer the front trailer wheels 28. The support assembly 42 may be comprised of a rigid housing 43 having laterally projecting stub shafts 44 on either side for pivotal support in a bearing hanger 45 on either side to accomplish a trunnion mount for the support housing 43. The bearing hangers 45 are mounted on the subframe 29. The support housing 43 has an internal opening 46 therethrough adapted to slidably receive the drawbar 40. In the drawings, the drawbar 40 and opening 46 are generally rectangular in cross-section having the long dimension positioned horizontally although it will readily appear to those skilled in the art that various tubular and structural shapes may be used without departing from this invention. The horizontally oriented rectangular shape is preferred in order to provide the maximum strength against lateral bending of the drawbar 40 upon applying the lateral loads required to turn the trailer. The trunnion mounting of housing 43 serves to permit the normal amount of up-down movement of the drawbar 40 relative to the trailer 25 in transit over bumps and dips in the roadway. The trunnion shafts 44 are rigidly supported and reinforced on the housing 43 by flanges 47 and the top plate 48 of the housing which is plug welded at 49 to the shafts.

The drawbar 40 is slidably positioned in the support assembly 42 but is prevented from being withdrawn through the front by stop lugs 50 welded on the trailing end of the drawbar which are adapted to abut the rearend of the housing 43. The drawbar 40 is latched in the desired position relative to the support assembly 42 by any convenient means such as a pin 51 adapted to pass vertically through diametrically positioned holes 52 and 53 in the support housing 43 and like holes 54 and 55 in the tubular drawbar 40. With the pin 51 in position the drawbar 40 is prevented from either extending or retracting whereas the stop lugs 50 merely prevent complete extraction of the drawbar from the support assembly 42. A plurality of matching holes 54 and 55 may be provided along the length of drawbar 40 as shown in FIGURE 1 so that the drawbar 40 may be adjusted in length to satisfy the requirements of the occasion. For example, as shown in FIGURE 14 the truck and trailer may be closely coupled together for greater maneuverability when the vehicles are unloaded or the roadway conditions and Vehicle Codes permit the closer spacing.

The operation of the arrangement of this invention is accomplished in the following manner. When the loaded truck and trailer arrive at the job site in the condition illustrated in FIGURE 1, the pin 51 is removed and the truck 10 is backed toward the trailer 25 thereby telescoping the drawbar 40 into a position under the trailer frame but without the truck hitting the trailer frame. At this time the drawbar 40 is retracted a sufficient distance for the rearend to be positioned over the platform 56 which is suspended at the rear of the trailer by support members 57 and 58 on either side of the frame as shown in FIGURE 11. The trailer hitch 20 is released whereupon the rearend of the drawbar 40 drops to rest upon the platform 56 and the truck 10 is free to proceed to the appropriate location and dump its load. The truck 10 returns with the tailgate 17 elevated and backs toward the front end of the trailer 25 thereby engaging the pintle eye 41 of the drawbar 40 and urging the drawbar into a further retracted position beneath the trailer and completely out of the way. Whether the pintle eye 41 becomes recoupled to the trailer hitch 20 as shown in FIGURE 2 will depend in part upon the type of trailer hitch and is unimportant at this stage. In any event the further rearward movement of the truck 10 causes the forwardly projecting horns 21 on the front end of the trailer frame 26 to become engaged in mating pockets 22 on the rear of the truck dump body 12 for a mating connection between the dump body and the trailer frame whereby the support rails on trailer frame 26 are aligned with similar support rails within dump body 12 for accommodating the rollers 32 and 33 of the trailer body. The trailer body 27 is then rolled forward by the electrically driven rollers (32 or 33) into the dump body 12 of the truck 10 where it is latched in placed by latch 35 and bar 36. At this point if the trailer hitch 20 has recoupled to the pintle 41 it must be uncoupled whereupon the truck 10 may proceed to the appropriate location and dump the contents of the trailer body 27. Upon returning to the trailer chassis the truck again backs toward the front of the trailer to reengage the horns 21 and pockets 22 whereby the trailer body 27 may be rolled back onto the trailer frame either electrically or by tilting the dump body 12. Again depending on the type of trailer hitch 20, the pintle eye may already be recoupled to the hitch automatically but in any event the pintle eye will be positioned within the hitch for the coupling operation since the mating coupling of horns 21 and pockets 22 forces the pintle eye to be in the proper position in the hitch. This arrangement completely dispenses with the necessity of the truck operator stationing himself between the truck and trailer to physically guide the pintle eye into the latching position in the hitch as is conventional with other arrangements. The truck 10 may then pull forward and the pin 51 installed through the appropriate holes 54, 55 of the drawbar to provide the desired length of drawbar whereupon the truck and trailer are ready for travel.

Since the rearmost end of the drawbar 40 will be resting upon the platform 56 upon return of the truck to the trailer chassis the pintle eye 41 may be pointing upwardly slightly above the elevation of the trailer hitch 20. Thus it is desirable to provide the trailer hitch 20 with a rearwardly projecting inclined guide 60 as shown in FIGURE 10. Guide 60 may include an inclined plane 61 with converging side flanges 62 whereby the rounded front of the pintle eye 41 will engage surface 61 and be urged into the mouth of hitch 20 as shown in FIGURE 9. The latch member 23 of a conventional automatically recoupling hitch 20 includes a portion 24 which is engaged by the pintle eye in the open position of the hitch to urge the latch 23 closed. The guide 60 also serves to accommodate variations in the roadway surface which might vertically misalign the pintle eye 41 above the hitch 20.

The trailer 25 requires an air line 65 for the brakes and electric tail light cable 66 connected from the truck 10. For the overall convenience of the arrangement of this invention, the line 65 and cable 66 are run through the interior of the tubular drawbar 40 and are adapted to be detachably connected (not shown) at their front end to the truck 10 in the conventional manner. To accommodate the telescoping movement of the drawbar 40 it is preferred that line 65 and cable 66 be suspended from the rearend of the drawbar to a hanger 67 near the middle of the trailer. A tension bridle spring 68 is attached to the line and cable for keeping them off the ground as for example in the intermediate position of the drawbar shown in FIGURE 14.

Referring now to FIGURE 12 a modified form of limit support for the trailing end of the drawbar 40 is shown. In this embodiment the support assembly 42 and all other components remain the same as heretofore described with the exception that the platform 56 and its support members are eliminated. Instead there is provided a hanger assembly 70 mounted on the subframe 29 of the trailer. The hanger assembly 70 includes a platform 71 suspended by a pair of rods 72 slidably mounted in a bracket 73 for vertical movement with shock absorbing compression springs 74 thereabove. In this arrangement a more forward portion of the drawbar 40 is supported on the platform 71 and the rearmost portion of the drawbar is freely suspended therefrom. The lateral space in between the hanger rods 72 need not be much greater than the width of the drawbar since the support housing of support assembly 42 and the hanger assembly 70 are aligned and mounted on the same subframe 29. Aside from this support arrangement for drawbar 40 and the afore-described support platform 56 it will readily appear to those skilled in the art that numerous arrangements for supporting the rearend of the drawbar may be used without departing from this invention.

Referring now to FIGURE 13 a modified arrangement for securing the drawbar 40 to the support assembly 42 is shown whereby the connection may be remotely and automatically made. Instead of providing the manually releasable pin 51 and vertically oriented holes 52, 53, 54 and 55 in the respective members for accommodating such pin, the drawbar 40 is provided with holes 80 and 81 on the vertical sides of the rectangular drawbar and latching assemblies 82 and 83 are provided on either side of the support assembly 42. The latching assemblies 82 and 83 are provided with reciprocating pins 84 and 85, respectively, which may be selectively urged into desired holes 80 and 81, respectively, of the drawbar 40 to latch the drawbar to the support assembly. Each latch assembly 82 and 83 includes a pneumatic actuator 86 mounted by a bracket 87 to the assembly 42 to which the respective pins 84 and 85 are connected for powered retraction of those pins upon activation of the actuators 86. The pins 84 and 85 are biased toward the engaged position by compression springs 88 which engage washers 89 mounted on the pins. By this arrangement the operator of truck 10 may release the pinned connection between drawbar 40 and support assembly 42 from his location in the cab of the truck. Thus when the truck and trailer arrive at the job site the driver may activate the pneumatic actuators 86 to release the drawbar 40 and back the truck 10 toward the trailer as the first step of the operation without leaving the truck controls. Of course when the drawbar 40 is in position to rest upon platform 56 or the hanger arrangement 70, the operator must leave the truck cab to release the trailer hitch 20, brake line 65 and electric cable 66, but at least one operation is automated. Moreover, upon retransferring the emptied trailer body 27 to the trailer the driver may at the same time recouple the hitch, air line and electric cable before returning to the cab, then pull forward to establish the desired length of drawbar 40, and deactivate the pneumatic actuators 86 to lock the drawbar 40 to the assembly 42 without leaving the cab again.

Having fully described my invention it is to be understood that I do not wish to be limited to the details herein set forth or to the details illustrated in the drawings but rather my invention is of the full scope of the appended claims.

I claim:

1. In a transfer trailer drawbar arrangement for use with a dump truck and trailer combination wherein the trailer body is transferred from the front of the trailer chassis to the dump truck body, comprising, a support assembly means mounted on the trailer chassis, a drawbar mounted in said support assembly means for extending between and connecting the truck and trailer, means for releaseably locking said drawbar to said support assembly means in the extending position, and said support assembly means and said drawbar selectively manipulatable upon release of said locking means to displace the drawbar from the extending position between the truck and trailer to a position substantially entirely into the trailer leaving the front of the trailer unobstructed for readily positioning the truck at the front of the trailer to accomplish said trailer body transfer.

2. The arrangement of claim 1 in which said support assembly means and drawbar are also selectively manipulatable to cause said drawbar to extend forwardly any one of plural selected distances at one time for establishing a predetermined distance between the truck and trailer.

3. The arrangement of claim 1 in which means are provided on the trailer chassis for supporting said drawbar off the ground in the rearwardly displaced condition of the drawbar upon disconnecting the drawbar from the truck.

4. The arrangement of claim 1 in which said drawbar is slidably mounted in said support assembly means and stop lugs are provided on a rear portion of said drawbar to engage said support assembly means for preventing disconnecting forward travel of said drawbar.

5. The arrangement of claim 1 in which said drawbar is displaced directly rearwardly into the trailer from its extending position and means are provided on the dump truck for guiding and urging the drawbar into recoupling relation with the truck from an uncoupled condition when the truck is back into trailer body transfer relationship.

6. The arrangement of claim 1 in which said drawbar and support assembly means are releaseably joined together by removable pin means in the extended position of the drawbar.

7. The arrangement of claim 6 in which actuator means are provided for moving said pin means between released and locked positions and means are provided for remotely activating said actuator means.

8. The arrangement of claim 1 in which said support means includes means for permitting up-down pivoting movement and longitudinal telescoping movement of said drawbar and preventing relative lateral movement between said drawbar and support means.

9. In a transfer trailer drawbar arrangement for use with a dump truck and trailer combination wherein the trailer body is transferred from the front of the trailer chassis to the dump truck body, comprising, a support assembly means mounted on the trailer chassis, a drawbar mounted in said support assembly means for extending between and connecting the truck and trailer, said drawbar having a relatively uniform exterior surface and said support assembly means including an open-through housing having an interior surface for slidably mating with said drawbar exterior surface for allowing longitudinal telescoping movement of said drawbar through said housing and preventing relative lateral movement between said drawbar and said housing, said housing being trunnion mounted for pivoting about a horizontal lateral axis, and said support assembly means and said drawbar selectively manipulatable to telescope the drawbar into the trailer from the extending position between the truck and trailer for positioning the truck at the front of the trailer to accomplish said trailer body transfer.

10. The arrangement of claim 9 in which said drawbar is tubular and brake and electric lines for operation of said trailer pass through the interior of said drawbar for releaseable connection to the truck.

11. In a transfer trailer drawbar arrangement for use with a dump truck and trailer combination wherein the trailer body is transferred from the front of the trailer chassis to the dump truck body, comprising, a support housing having means mounting the housing on said trailer chassis for at least limited free pivotal movement about a lateral horizontal axis and for any lateral pivoting of the housing to cause like steering of the trailer, a drawbar mounted in said support housing with cooperating means for longitudinal telescoping movement of said drawbar through said housing, said drawbar having a forward end adapted to be hitched to the dump truck, and means for releaseably connecting said drawbar to said support housing at least at a forwardly extended position of said drawbar for in-transit operation and releaseable for telescoping the drawbar substantially entirely into the trailer to an unobstructive position for accomplishing the forward trailer body transfer.

12. In a transfer trailer drawbar arrangement for use with a dump truck and trailer combination wherein the trailer body is transferred from the front of the trailer chassis to the dump truck body in which the trailer has forwardly positioned means for mating engagement with the dump truck in the trailer body transfer condition and spaced front and rear axles and wheels with a subframe pivotally mounted on said frame and supporting said front axle for trailer steering, the drawbar arrangement comprising; a support assembly means mounted on the trailer subframe for pivotal movement about a lateral horizontal axis, a drawbar adapted for connection to the truck and mounted in said support assembly means for longitudinal telescoping movement of said drawbar relative to said means, and means for releaseably connecting said drawbar to said support assembly means in at least a forwardly extended position of said drawbar for in-transit operation of said truck and trailer in substantially spaced relation and said connecting means releaseable for telescoping the drawbar into the trailer to accomplish the said mating engagement between the rear of the truck and the front of the trailer for trailer body transfer.

13. The arrangement of claim 12 in which said drawbar has a relatively uniform exterior surface and said support assembly means includes an open-through housing having an interior surface for slidably mating with said drawbar exterior surface, said housing being trunnion mounted for providing said pivotal movement about a horizontal lateral axis.

14. The arrangement of claim 12 in which means are provided on the trailer chassis for supporting said drawbar off the ground in the rearwardly displaced condition of the drawbar upon disconnecting the drawbar from the truck.

15. The arrangement of claim 12 in which said support assembly means and drawbar are also selectively manipulatable to cause said drawbar to extend forwardly any one of plural selected distances at one time for establishing a predetermined distance between the truck and trailer.

16. In a transfer trailer for use with a dump truck wherein the trailer body is transferred from the trailer chassis to the dump truck body, comprising, a frame for supporting the trailer body and having forwardly means for mating engagement with the dump truck in the trailer body transfer condition, spaced front and rear axles on said frame with ground-engaging wheels, a subframe pivotally mounted on said frame and supporting said front axle for trailer steering, support means mounted on said subframe, a drawbar having means for connecting to the dump truck and mounted in said support means for selective longitudinal movement of said drawbar relative to said support means, and means locking said drawbar to said support means and selectively releaseable for movement of said drawbar to an unobstructive position beneath said trailer to accomplish the said mating engagement between truck and trailer for trailer body transfer.

17. In a transfer trailer for use with a dump truck wherein the trailer body is transferred from the trailer chassis to the dump truck body, comprising, a frame having longitudinal rails for supporting the trailer body and forwardly projecting means for mating engagement with the dump truck in the trailer body transfer condition, spaced front and rear axles on said frame with ground-engaging wheels, a subframe pivotally mounted on said frame and supporting said front axle for trailer steering, a support housing mounted on said subframe for pivotal movement about a lateral horizontal axis, a drawbar mounted in said support housing for telescoping movement of said drawbar through said housing, said drawbar having a forward end adapted to be hitched to the dump truck, means for releaseably connecting said drawbar to said support housing in plural forwardly extended positions of said drawbar for in-transit operation of the truck and trailer at predetermined spacing therebetween and said means releaseable for telescoping the drawbar into the trailer to accomplish the said mating engagement between truck and trailer for trailer body transfer, and means on the trailer chassis for supporting said drawbar off the ground in the rearward telescoped position of the drawbar upon release of said hitched connection with the truck.

References Cited

UNITED STATES PATENTS

| | | | |
|---|---|---|---|
| 1,598,084 | 8/1926 | Kingham et al. | 280—482 |
| 1,915,883 | 6/1933 | Fager | 214—38 |
| 2,409,399 | 10/1946 | Solon | 280—477 |
| 2,446,223 | 8/1948 | Forney | 280—482 X |
| 2,494,735 | 1/1950 | Ambarcumian | 214—38 |
| 3,154,325 | 10/1964 | Thompson et al. | 280—482 X |
| 3,244,434 | 4/1966 | Reed et al. | 280—482 |
| 3,307,718 | 3/1967 | Sjostrom | 214—38 |

ROBERT G. SHERIDAN, *Primary Examiner.*

U.S. Cl. X.R.

280—477, 482